(12) United States Patent
VanBecelaere

(10) Patent No.: US 10,054,399 B2
(45) Date of Patent: Aug. 21, 2018

(54) SELF-ILLUMINATING TURRET COVER

(71) Applicant: Vista Outdoor Operations LLC, Farmington, UT (US)

(72) Inventor: Jacob C. VanBecelaere, Gardner, KS (US)

(73) Assignee: Vista Outdoor Operations LLC, Farmington, UT (US)

( * ) Notice: Subject to any disclaimer, the term of this patent is extended or adjusted under 35 U.S.C. 154(b) by 0 days.

(21) Appl. No.: 15/646,466

(22) Filed: Jul. 11, 2017

(65) Prior Publication Data
US 2018/0010887 A1     Jan. 11, 2018

Related U.S. Application Data

(60) Provisional application No. 62/360,809, filed on Jul. 11, 2016.

(51) Int. Cl.
| | |
|---|---|
| *F41G 1/38* | (2006.01) |
| *F41G 3/08* | (2006.01) |
| *G02B 7/00* | (2006.01) |
| *G02B 23/00* | (2006.01) |

(52) U.S. Cl.
CPC ............... *F41G 1/38* (2013.01); *F41G 3/08* (2013.01); *G02B 7/004* (2013.01); *G02B 23/00* (2013.01)

(58) Field of Classification Search
CPC .................................. F41G 1/345; F41G 1/38
See application file for complete search history.

(56) References Cited

U.S. PATENT DOCUMENTS

| | | | |
|---|---|---|---|
| 3,990,155 A | 11/1976 | Akin, Jr. et al. | |
| 4,965,439 A | 10/1990 | Moore | |
| 6,269,581 B1 | 8/2001 | Groh | |
| 6,862,832 B2 | 3/2005 | Barrett | |
| 7,703,679 B1 | 4/2010 | Bennetts et al. | |
| 7,937,879 B2* | 5/2011 | Hamilton | F41G 1/38 42/111 |
| 8,166,697 B1* | 5/2012 | Sueskind | F41G 1/38 42/119 |

(Continued)

FOREIGN PATENT DOCUMENTS

DE     202012102101     7/2012

*Primary Examiner* — Stephen Johnson
*Assistant Examiner* — Joshua T Semick
(74) *Attorney, Agent, or Firm* — Christensen, Fonder, Dardi & Herbert PLLC

(57) ABSTRACT

A turret cover for a turret assembly. In one or more embodiments the turret cover includes an upper portion including a turret housing defining a battery recess and an illumination recess. An illumination assembly can be mounted in the illumination recess. In various embodiments, the illumination assembly includes a downwardly facing surface including a lighting element. In various embodiments, the turret cover includes a lower portion including an exterior sleeve portion of an at least partially transparent plastic material and a plurality of etched adjustment marks. In some embodiments, the lower portion is at least partially inserted into the illumination recess such that an upwardly facing edge of the exterior sleeve portion is positioned adjacent to the lighting element of the illumination assembly such that, in operation, the lighting element illuminates the plurality of etched adjustment marks via an edge lighting process.

20 Claims, 11 Drawing Sheets

(56) References Cited

U.S. PATENT DOCUMENTS

| | | |
|---|---|---|
| 8,464,451 B2 | 6/2013 | McRae |
| 8,713,843 B2 | 5/2014 | Windauer |
| 9,038,901 B2 | 5/2015 | Paterson et al. |
| 9,062,934 B1 * | 6/2015 | Presley .................. F41G 1/387 |
| 9,151,570 B2 | 10/2015 | Plaster |
| 9,829,277 B2 * | 11/2017 | Ratliff ..................... F41G 1/345 |
| 2010/0229451 A1 | 9/2010 | Hamilton |
| 2015/0247702 A1 | 9/2015 | Davidson et al. |
| 2015/0285599 A1 | 10/2015 | Downing |
| 2016/0146576 A1 | 5/2016 | White et al. |
| 2017/0160055 A1 * | 6/2017 | Meinert ................. F41G 1/473 |

* cited by examiner

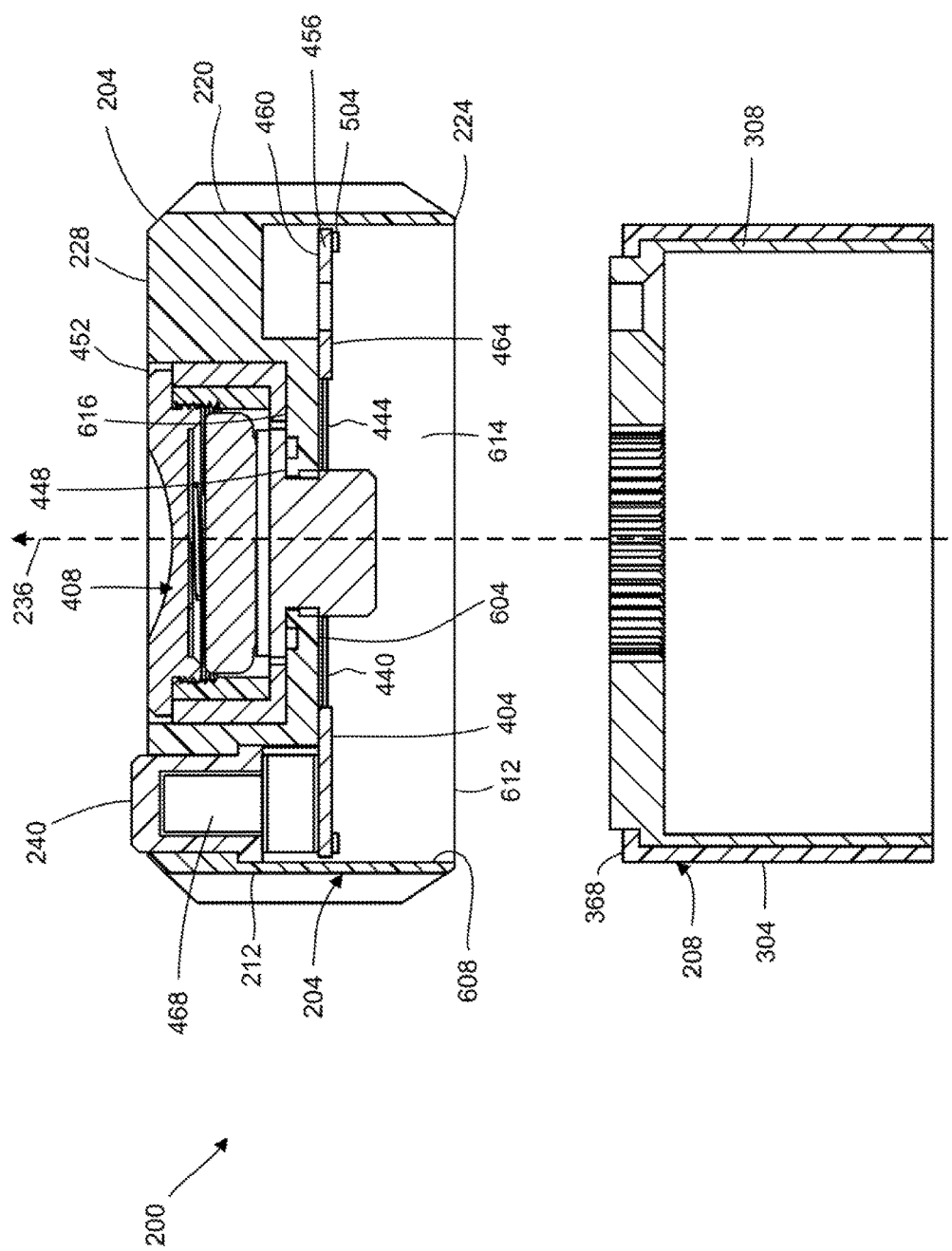

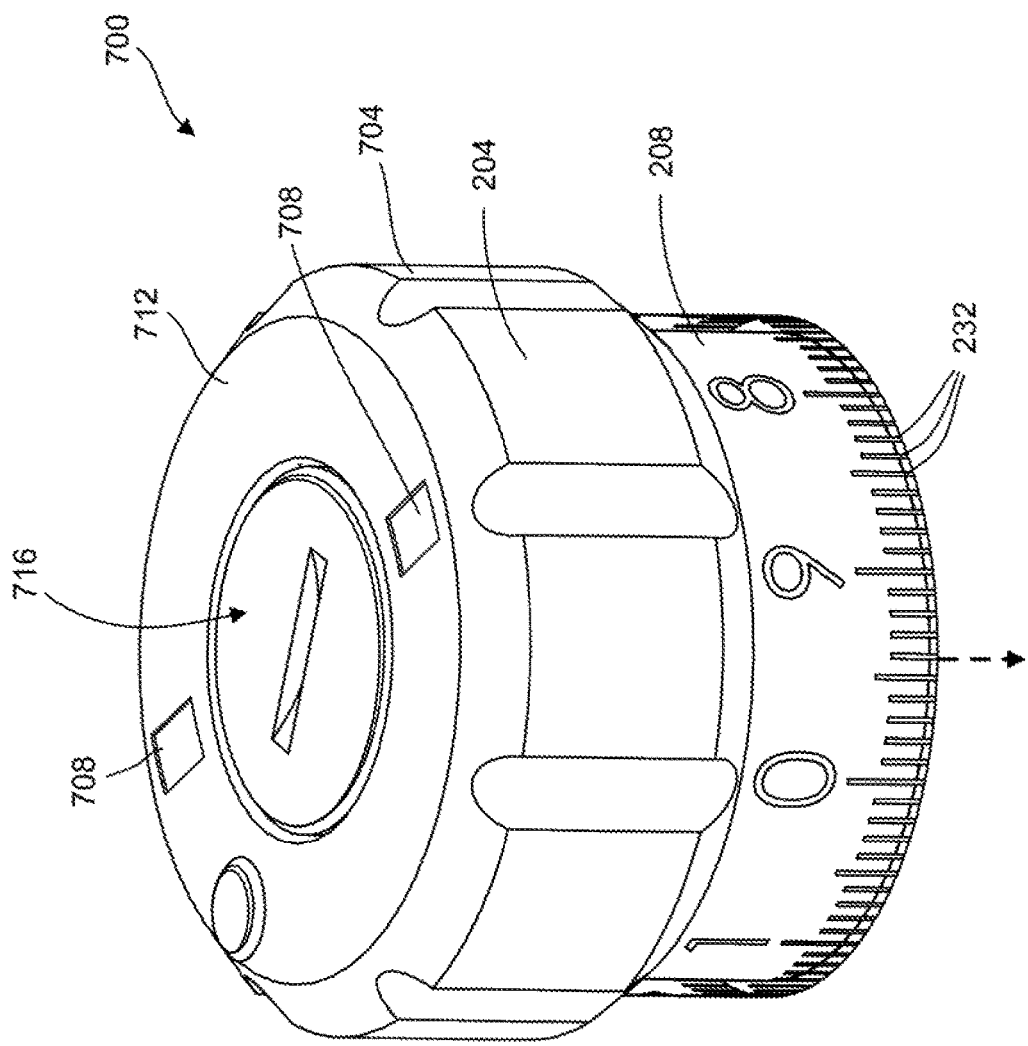

SELF-ILLUMINATING TURRET COVER

CROSS-REFERENCE TO RELATED APPLICATION

This application claims the benefit of U.S. Provisional Patent Application No. 62/360,809, filed Jul. 11, 2016, the disclosure of which is incorporated by reference herein.

TECHNICAL FIELD

The present disclosure relates to a turret for a firearm aiming device. Specifically, the disclosure relates to a turret for a firearm aiming device, such as a riflescope, having illuminated adjustment markers.

BACKGROUND

Many firearms, such as rifles, are equipped with a firearm aiming device, such as a rifle scope, that provides the user with an image of an aligned aiming point or pattern (commonly known as a reticle) superimposed at the same focus as the target.

When shooting at long distances, shooters must adjust their aim to take into account the downward acceleration on the projectile imparted by gravity, which often referred to as "bullet drop." This is typically done by adjusting the angular position of the rifle scope relative to the rifle barrel using an elevation turret. Additionally, shooters can adjust their aim to take into account lateral movement of the projectile imparted by wind forces. This is typically done by adjusting the position of the rife scope for left-to-right movement relative to the rifle barrel using a windage turret.

A zero point (also sometimes referred to as a "zero mark" or "zero location" or similar) for a rifle scope is determined when "sighting" a rifle, or other firearm, at a known distance by adjusting the angular position of the riflescope relative to the rifle barrel, via the elevation turret, until the impact point of the bullet matches the point on the target coincident with the optical center of the riflescope reticle. The zero point of the riflescope is set such that the rifle is sighted in at a first known distance, sometimes referred to as the "zero distance" or in some cases, the "zero-stop distance." This known distance is typically the shortest distance for which the rifle is sighted. For targets at greater distances than the zero distance, the elevation turret is rotated to adjust the angular position of the scope with respect to the rifle barrel to compensate for the greater amount of bullet drop over the longer distance. For example, a zero-point of a turret may be set to correspond to a zero distance of 100 yards. For distances greater than the zero distance of 100 yards, a user rotates or "dials" the elevation turret a predetermined amount, often measured in minutes of angle (MOA) or mils, such that the riflescope is sighted in for the greater distance. For example, in a typical riflescope turret having sighting indicia, the indicium/number "0" may correspond to the zero-point distance of 100 yards; the number 3, or 3 MOA may correspond to 200 yards, and so on. When the "0" indicium on the turret is aligned with an alignment mark ("zero mark") on the riflescope body, the rifle scope is sighted in ("zeroed in") at the zero distance, e.g., 100 yards, such that a bullet should accurately strike a target located 100 yards from the user.

Generally, a turret on a firearm aiming device includes multiple adjustment marks or indicators which are used to indicate to a shooter the amount of rotation that the turret has undergone to adjust the angular position of the scope. For example, the adjustment marks can be compared to a static reference point on the riflescope to determine the MOA adjustment for zeroing in, or, after the riflescope is zeroed in, for adjustments to the angular position of the scope to compensate for bullet drop or wind.

SUMMARY

Various embodiments of the disclosure are directed to a turret cover for a turret assembly including self-illumination capabilities to improve the visibility of adjustment marks on the turret cover. In some instances, a shooter can have difficulty seeing adjustment marks on a turret cover when using a turret assembly. For example, the low-light conditions of early morning or late night, or when a shooter is positioned in an unlit structure, can present situations where a lack of light impairs the visibility of adjustment marks which in turn makes aiming adjustments for zeroing in a scope, or subsequent aiming adjustments more difficult.

Accordingly, various embodiments of the disclosure include, but are not limited to, a self-illuminated turret cover for a turret assembly. In one or more embodiments, the turret cover includes one or more internal lighting elements to illuminate adjustment markings via an edge lighting process. In various embodiments, the edge lighting process results in only the adjustment marks on the turret cover being illuminated, allowing for improved recognition and visibility of the adjustment marks including in low light conditions.

One or more embodiments of the disclosure include an upper portion and lower portion that are secured together to form the turret cover. In certain embodiments the upper cover includes a turret housing that defines a battery recess and an illumination recess. In certain embodiments, a battery assembly is mounted in the battery recess and an illumination assembly is mounted in the illumination recess and electrically connected to the battery assembly. In various embodiments, the illumination assembly includes one or more lighting elements. In one or more embodiments, the lower portion includes an exterior sleeve portion of an at least partially transparent plastic material that includes a plurality of etched adjustment marks. In various embodiments, the lower portion is at least partially inserted into the illumination recess such that an upwardly facing edge of the exterior sleeve portion is positioned adjacent to the one or more lighting elements of the illumination assembly. In certain embodiments, in operation, the one or more lighting elements of the illumination assembly are powered on by the battery assembly and illuminate, via an edge lighting process, the plurality of etched adjustment marks.

Some embodiments are directed to a firearm aiming device including a scope body including an interior erector assembly and reticle cell. In certain embodiments, a turret assembly is mounted on the scope body. In one or more embodiments the turret assembly includes an interior mechanical portion configured to engage the erector assembly within the scope body for making aiming adjustments. In one or more embodiments, the turret assembly further includes a turret cover enclosing the interior mechanical portion. One or more embodiments include an upper portion and lower portion that are secured together to form the turret cover. In one or more embodiments, the upper portion includes a turret housing having a sidewall extending from a lower end to a top surface. In certain embodiments, the lower end of the sidewall defines a first opening in the turret housing to a downwardly facing interior surface that, along with a first interior surface of the sidewall, defines an illumination recess in the turret housing. In some embodiments, the top surface defines a second opening in the turret housing to an upwardly facing interior surface that, along with a second interior surface of the sidewall, defines a battery recess. In one or more embodiments, the turret cover includes a battery assembly mounted in the battery recess and an illumination assembly mounted in the illumination recess and electrically connected to the battery assembly.

In one or more embodiments, the illumination assembly includes a circuit board having an upwardly facing surface positioned adjacent to the downwardly facing interior surface of the illumination recess. In certain embodiments, the circuit board includes a downwardly facing surface including one or more lighting elements.

In certain embodiments, the lower portion includes an exterior sleeve portion of an at least partially transparent plastic material surrounding an interior backing portion. In various embodiments, the exterior sleeve portion includes a plurality of adjustment marks etched into the at least partially transparent material. The lower portion can be at least partially inserted into the illumination recess and secured or fastened to the upper portion such that an upwardly facing edge of the exterior sleeve portion is positioned adjacent to the one or more lighting elements of the illumination assembly. As such, in one or more embodiments, when in operation, the one or more lighting elements of the illumination assembly are powered on by the battery assembly thereby illuminating the plurality of etched adjustment marks via an edge-lighting process.

Certain embodiments of the disclosure are directed to a system for illumination of a turret assembly on a firearm aiming device. In some embodiments, the system includes a turret cover, including an upper portion including a turret housing defining an illumination recess. In one or more embodiments, the turret cover includes a lower portion including an exterior sleeve portion of an at least partially transparent plastic material, the exterior sleeve portion including a plurality of adjustment marks etched into the at least partially transparent material, the lower portion at least partially inserted into the illumination recess such that an upwardly facing edge of the exterior sleeve portion is positioned adjacent to one or more lighting elements of the illumination assembly. And in some embodiments, the system includes a battery assembly electrically coupled to the turret cover and the illumination assembly.

Some embodiments are directed to a turret cover including a lower portion including an exterior sleeve portion having a sidewall extending from a lower end to an upper end and defining a first opening at the upper end and a second opening at the lower end. In various embodiments the sidewall includes a plurality of optical fibers, each of the plurality of optical fibers positioned at least partially within the sidewall and extending between the upper end and lower end of the sidewall. In certain embodiments each of the plurality of optical fibers have an exposed first end at an upwardly facing edge of the upper end of the sidewall, the sidewall including a plurality of adjustment marks spaced circumferentially about an exterior surface of the sidewall. In one or more embodiments the lower portion is at least partially inserted into the illumination recess such that the upwardly facing edge is positioned adjacent to the lighting element of the illumination assembly. In various embodiments, in operation, the lighting element of the illumination assembly is powered on by the battery assembly and illuminates, via the plurality of optical fibers, the plurality of adjustment marks.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 6A and 6B depict a cross-sectional view of a turret cover, according to one or more embodiments of the disclosure.

FIG. 7 depicts a perspective view of a turret cover, according to one or more embodiments of the disclosure.

Figure 1:
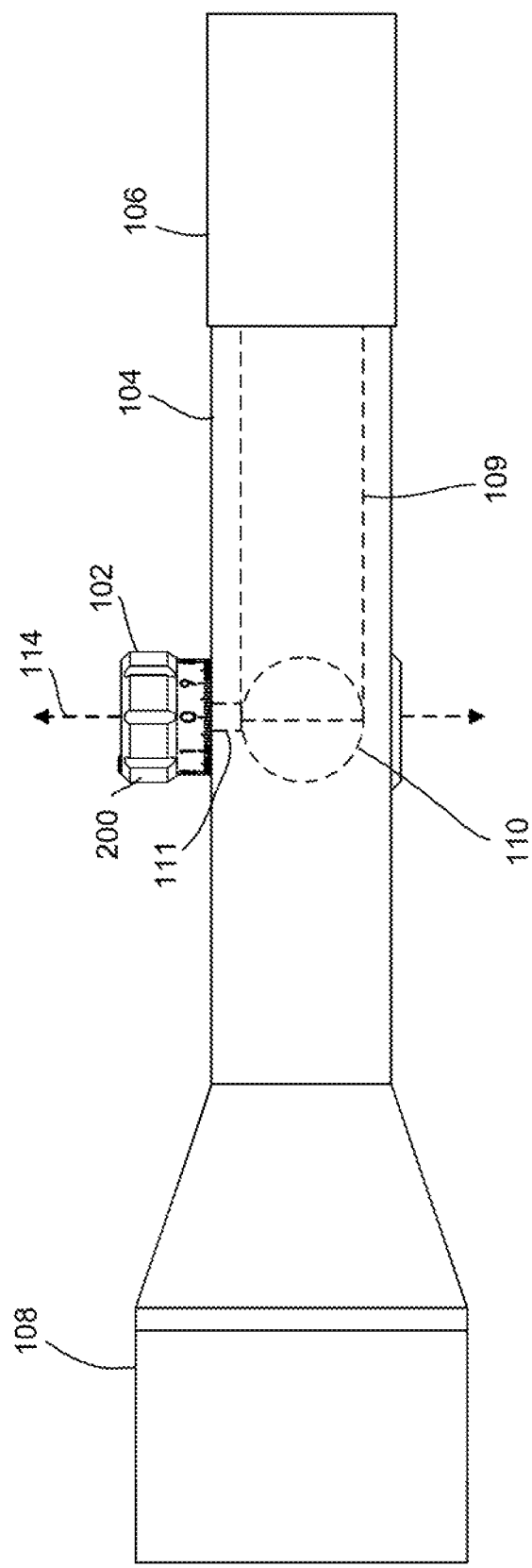
FIG. 1 depicts a side view of a firearm aiming device and turret assembly, according to one or more embodiments of the disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

FIG. 1, depicts a firearm aiming device 100 according to one or more embodiments of the disclosure. The firearm aiming device 100 is an optical firearm scope or rifle scope, and, for the sake of brevity, is referred to herein as a "scope" 100. It should be understood that scope 100 is not limited to being an optical scope for a rifle, but, in various embodiments, can include other various forms of firearm aiming devices. In certain embodiments, scope 100 is attachable to, and/or useable with various types of firearms, such as rifles, shotguns, handguns, bows or other types of firearms or weapons.

In one or more embodiments, scope 100 includes a turret assembly 102, scope body 104, ocular housing 106 carrying an ocular lens system, objective housing 108 carrying an objective lens system, and an erector assembly with reticle cell 109. In some embodiments, scope 100 includes one or more turret assemblies in addition to turret assembly 102. For example, in some embodiments, scope 100 additionally includes a second turret assembly. The second turret assembly can be configured as a windage turret for making lateral aiming adjustments and positioned approximately at the dashed, circular line 110 depicted as in FIG. 1, on either side of the scope body 104.

In various embodiments, turret assembly 102 is rotatably mounted to scope body 104. Depicted in FIG. 1, turret assembly 102 is configured as an elevation turret for making vertical aiming adjustments by moving the erector assembly with reticle cell 109, relative to scope body 102. The composition and functioning of an erector assembly and lens systems of a scope are well known in the art, and will not be described in detail herein. However, such details can be found, for example, in U.S. Pat. No. 9,297,615, entitled "Multiple-Zero-Point Riflescope Turret System", issued Mar. 29, 2016, which is herein incorporated by reference in its entirety.

In one or more embodiments, turret assembly 102 includes an interior mechanical portion 111 which is enclosed within an exterior turret cover 200 and at least partially positioned within scope body 104. The interior mechanical portion 111 is a portion of the turret assembly 102 that includes one or more of the various functional mechanisms in the turret assembly 102 configured to provide aiming adjustments within the scope 100. In one or more embodiments, the turret cover 200 is an exterior sheath or cover configured to be manipulated by a shooter to control the functional mechanisms in the interior mechanical portion. For example, in certain embodiments, a user can grab and rotate the turret cover 200 about an axis 114 to engage the interior mechanical portion 201 with the erector assembly with reticle cell 109 control the position of the erector assembly within the scope 100, thereby making vertical aiming adjustments.

Figure 2:
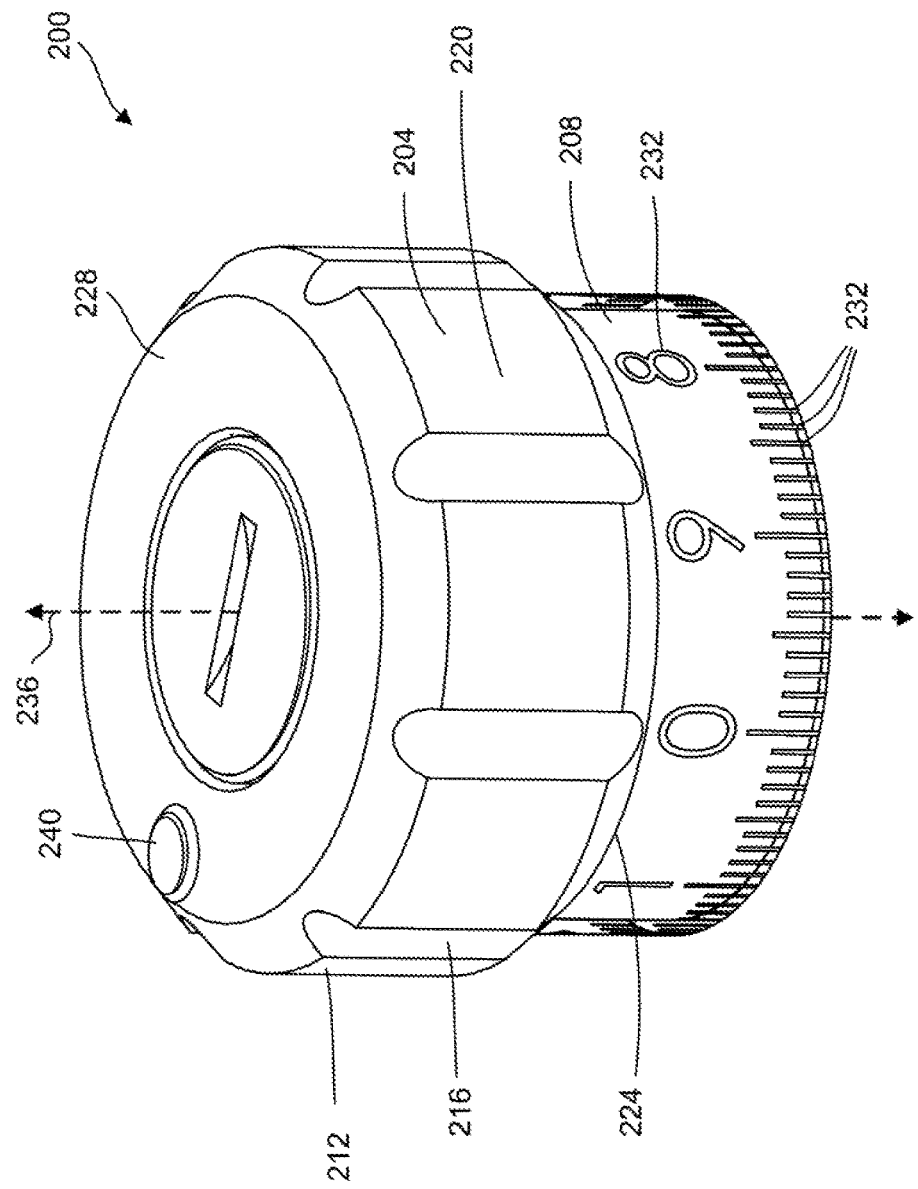
FIG. 2 depicts a perspective view of a turret cover, according to one or more embodiments of the disclosure.

FIG. 2 depicts a self-illuminated turret cover 200 for a turret assembly, according to one or more embodiments of the disclosure. As described above, turret cover 200 is a cap or top cover for a turret assembly, such as turret assembly 102 (FIG. 1). In some embodiments, turret cover 200 has a generally cylindrical shape defined by an upper portion 204 and a lower portion 208. Depicted in FIG. 2, the upper portion 204 and lower portion 208 are assembled together to form a single, generally cylindrical piece that can be secured to and enclose an interior mechanical portion of a turret assembly, described above with reference to FIG. 1.

In various embodiments, upper portion 204 is a portion of the turret cover 200 configured to be grasped by a user for controlling aiming adjustments. As such, in certain embodiments, upper portion 204 includes a turret housing 212 having a sidewall 220 defining a generally cylindrical shape that extends from a lower end 224 to a top surface 228. In some embodiments, the sidewall 220 defines a diameter for the upper portion 204 that is generally larger than the lower portion 208, and, in some embodiments, defines a plurality of gripping recesses 216 which are positioned circumferentially about the turret housing 212.

In one or more embodiments, lower portion 208 is a portion of the turret cover 200 configured to provide an indication to a user of the amount of aiming adjustment that has been made using a turret assembly. As such, in one or more embodiments, lower portion 208 includes various adjustment marks 232 of lines and/or numbers which are positioned circumferentially about the lower portion 208. These adjustment marks 232 can be aligned with a reference mark, such as a zero mark, on a scope body to assist a shooter in determining a relative rotational position for the turret cover 200 about central axis 236. This rotational position can indicate a specific aiming adjustment to the shooter for zeroing in or for other aiming adjustments of the scope.

In one or more embodiments, the turret cover 200 is configured for self-illumination of the adjustment marks 232. As such, and described further below, in various embodiments, the upper portion 204 includes an illumination assembly, having a plurality of lighting elements, housed within the turret housing 212 configured to illuminate the various adjustment marks 232 of the lower portion 208. In certain embodiments, the turret housing 212 includes an external switch 240 configured to interact with the illumination assembly to control the lighting elements therein. Described further below, in operation, the illumination assembly can illuminate the adjustment marks 232 via an edge-lighting process.

Figure 3A:
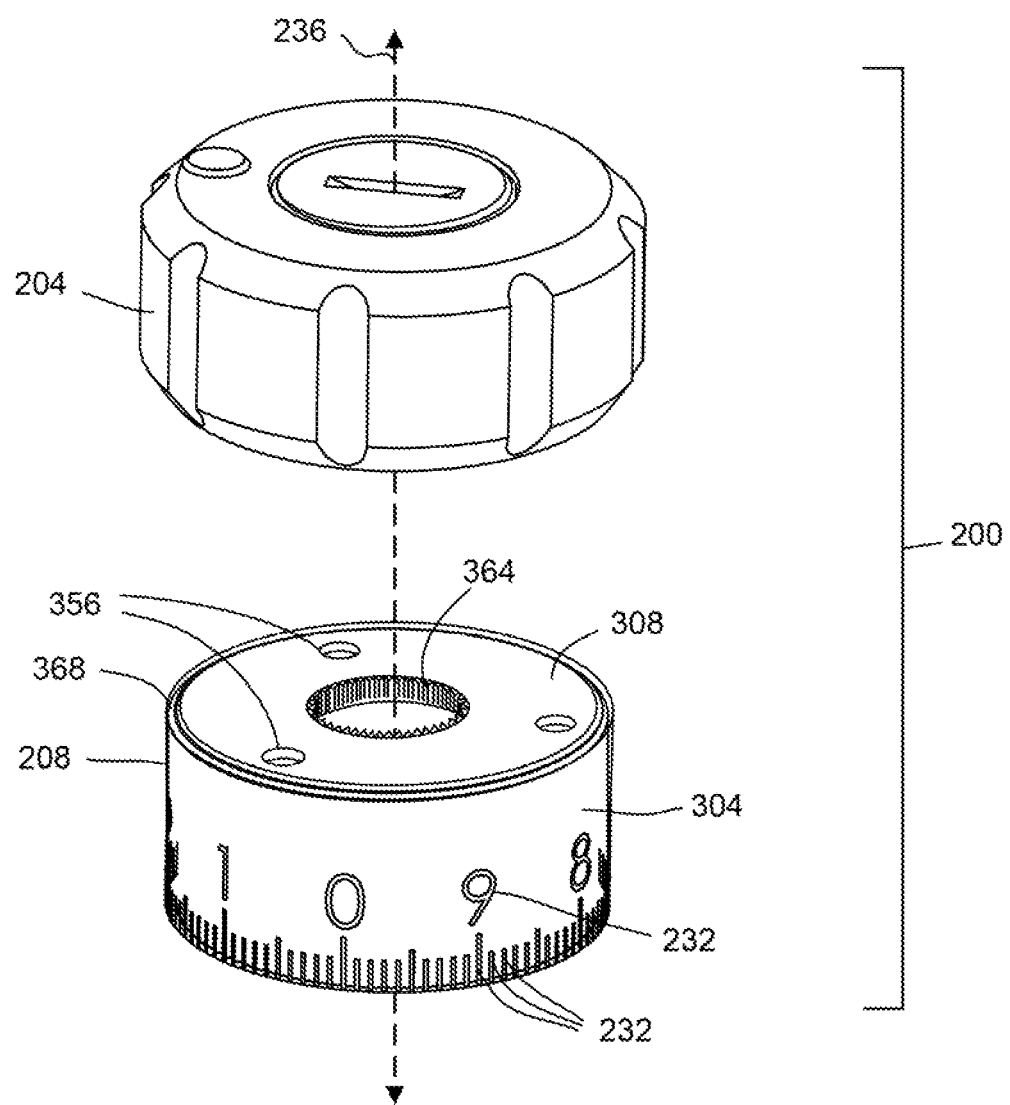
FIGS. 3A and 3B depict exploded views of a turret cover, according to one or more embodiments of the disclosure.
Figure 3B:
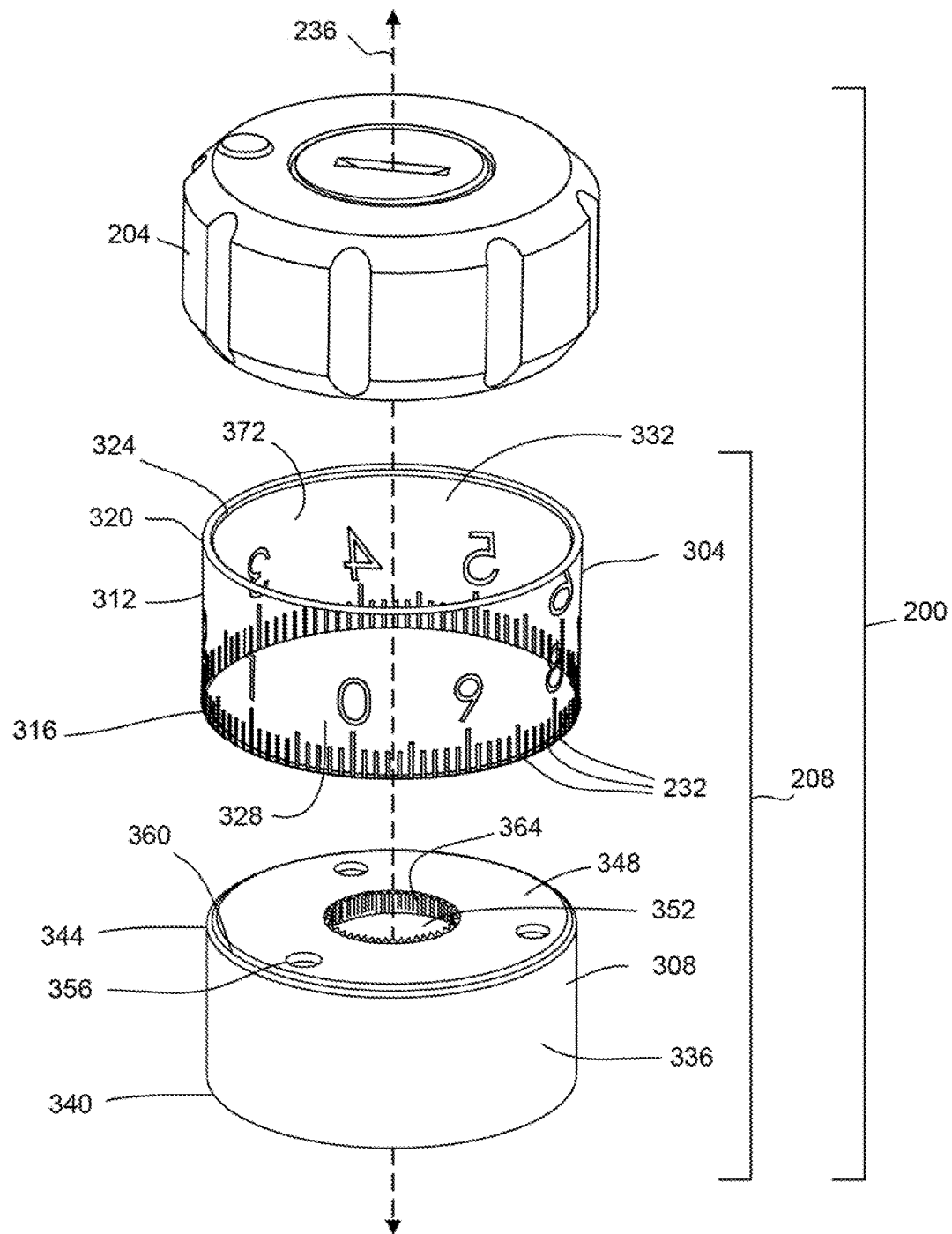

FIGS. 3A and 3B depict partially exploded views of the turret cover 200, according to one or more embodiments of the disclosure. FIG. 3A depicts an exploded view of the turret cover 200 with the upper portion 204 and lower portion 208 separated from one another along a central axis 236. In various embodiments, the lower portion 208 includes an exterior sleeve portion 304 surrounding an interior backing portion 308 inserted within the exterior sleeve portion 304. FIG. 3B depicts a further exploded view of the turret cover 200, with the exterior sleeve portion 304 and the interior backing portion 308 separated from one another along the central axis 236.

In one or more embodiments, the exterior sleeve portion 304 has a generally cylindrical shape defined by a sidewall 312 that extends from a lower end 316 to an upper end 320. In one or more embodiments, the exterior sleeve portion 304 includes a flange portion 324 at the upper end 320 that extends inwardly towards the central axis 236. The upper end 320 and lower end 316 of sidewall 312 define respective openings 328 and 332.

In various embodiments, the interior backing portion 308 has a cylindrical shape defined by a sidewall 336 that extends from a lower end 340 to an upper end 344 and top surface 348. In various embodiments, the top surface 348 defines a central aperture 352 and a plurality of fastener apertures 356. In certain embodiments, the interior backing portion 308 includes a circumferential lip 360 defined by a circumferential recess that extends inwardly toward the central axis 236.

In one or more embodiments, the central aperture 352 includes a splined surface 364 including a plurality of splines. Splines extend axially along their lengths, and project radially toward the central axis 236 along their respective heights. In various embodiments, splines include projections, teeth, or other projecting structures which function to engage with complementary structure. For example, a plurality of recesses are defined between pairs of adjacent splines and are configured to receive complementary splines or projections of a splined portion of an interior mechanical portion of a turret assembly, such as a turret screw.

In various embodiments, fastener apertures 356 are sized to receive screws, plugs, or other suitable fasteners for securing the turret cover 200 to a turret assembly. In some embodiments, fastener apertures 356 are used to secure the lower portion 208 and upper portion 204 of the turret cover 200 together.

As depicted in FIGS. 3A and 3B, the exterior sleeve portion 304 and interior backing portion 308 are sized such that the interior backing portion 308 is upwardly insertable into the exterior sleeve portion 304 via opening 328. As such, in certain embodiments, and when assembled, the lower portion 208 includes an upwardly facing annular edge 368 that is defined by the exterior sleeve portion 304 and surrounds the interior backing portion 308. In various embodiments, flange portion 324 of the exterior sleeve portion 304 and the circumferential lip 360 fit together to limit upward insertion of the interior backing portion 308.

In various embodiments, the exterior sleeve portion 304 is constructed from an at least partially transparent plastic, such as acrylic, polycarbonate, or other plastic suitable for edge lighting. Additionally, in one or more embodiments, the adjustment marks 232 are etched into the plastic material of the exterior sleeve portion 304 so that they are externally visible to a user and so that the adjustment marks 232 illuminate in response to edge lighting the exterior sleeve portion 304. For example, in certain embodiments, the adjustment marks 232 are illuminated by light which is received via the upwardly facing annular edge 368 and which is transmitted through the material of the external sleeve portion 304 and reflects off of etched portions, thereby illuminating adjustment marks 232. Additionally, in certain embodiments, the adjustment marks 232 are painted, for example using tritium paint, or other suitable paint, to improve the visibility of the etched adjustment marks 232.

In various embodiments, the interior backing portion 308 is constructed from metal, plastic, or other suitable material. In various embodiments, interior backing portion 308 is constructed from a substantially non-transparent material to form a visual backing for the lower portion 208 and to improve the visibility of the alignment marks 232 by increasing contrast between the alignment marks 232 and the surface of the interior backing portion 308. In some embodiments, the exterior sleeve portion 304 itself forms the visual backing. For example, in some embodiments an interior surface 372 is painted such that it is substantially non-transparent.

Figure 4:
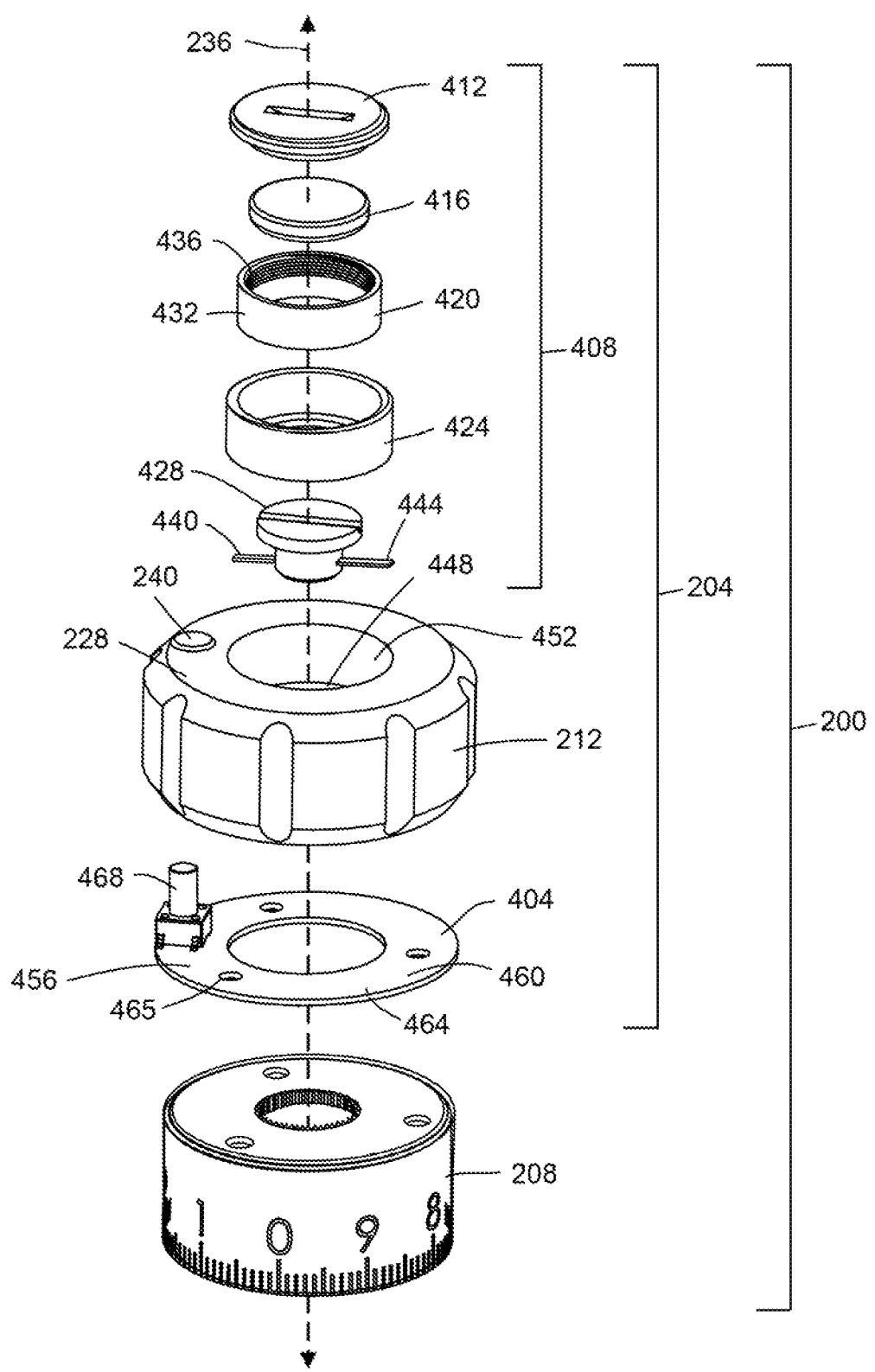
FIG. 4 depicts an exploded view of an upper portion of a turret cover, according to one or more embodiments of the disclosure.

FIG. 4 depicts a further exploded view of upper portion 204 and turret housing 212 along central axis 236. In one or more embodiments, the upper portion 204 further includes an illumination assembly 404 and a battery assembly 408.

In certain embodiments, battery assembly 408 includes a battery cover 412, a battery 416, a battery housing portion 420, a mounting ring 424, and a battery contact portion 428. In various embodiments, the battery housing portion 420 is a portion of the battery assembly 408 configured to house the battery 416. As such, battery housing portion 420 includes a sidewall 432 defining a central recess for containing battery 416 and having an interior threaded portion 436 configured to attach with the battery cover 412 to enclose the battery 416 in the central recess. In various embodiments, battery housing portion 420 is sized to fit inside mounting ring 424, which is configured as a spacer that fills a battery recess 448 defined in the turret housing 212 to create a suitable fit for the battery assembly 408 in turret housing 212.

In various embodiments, when assembled, the battery contact portion 428 is first lowered into the battery recess 448 with the battery housing portion 420 and mounting ring 424 lowered onto the battery contact portion 428. As a result, in one or more embodiments, the battery cover 412 and battery contact portion 428 form an electrical pathway through the battery assembly 408 from the battery 416 to electrical pathways or contacts 440 and 444 which, in an embodiment, extend laterally from the battery contact portion 428 to supply power to the illumination assembly 404, described further below. Although the term "contacts" 440 and 444 are used herein, it will be understood that "contacts" refers to any electrically conductive pathway, including wires, printed-circuit board traces, electrical terminals, and so on.

In one or more embodiments, the illumination assembly 404 includes a circuit board 456 having various control, lighting, power distribution and conditioning components, and other electrical components. Circuit board 456 may comprise a printed circuit board, having an upwardly facing surface 460 and a downwardly facing surface 464. Described further, with reference to FIGS. 5A and 5B, the downwardly facing surface 464 includes a plurality of lighting elements electrically connected together and to a switch 468 mounted on the upwardly facing surface 460. In various embodiments, the switch 468 is configured to control the light output of the various lighting elements of the illumination assembly. In certain embodiments, when assembled, switch 468 is configured to interact with external switch 240 of the turret housing 212 for controlling or toggling of the lighting elements and for controlling or toggling the turret cover between various self-illumination settings.

In an embodiment, the electrical components of circuit board 456 may include a processor or controller, and in some embodiments, a memory device, for controlling the lighting elements. Control of the lighting elements may include on/off control, color selection, time-delayed shut-off (turning off the lighting elements after a predetermined time), and other control functions. Although the electrical components are described as being part of, or connected to, circuit board 456, some components may be located or housed in alternative portions of the lighted turret cover.

Additionally, in certain embodiments, circuit board 456 includes fastener apertures 465. In various embodiments, fastener apertures 465 are aligned with fastener apertures 356 of the lower portion 208. Fastener apertures 465 are sized to receive screws, plugs, or other suitable fasteners for securing the illumination assembly 404 to the turret housing 212. In some embodiments, fastener apertures 356 are used with fastener apertures 356 to secure the turret cover to an interior mechanical portion of a turret assembly.

Figure 5A:
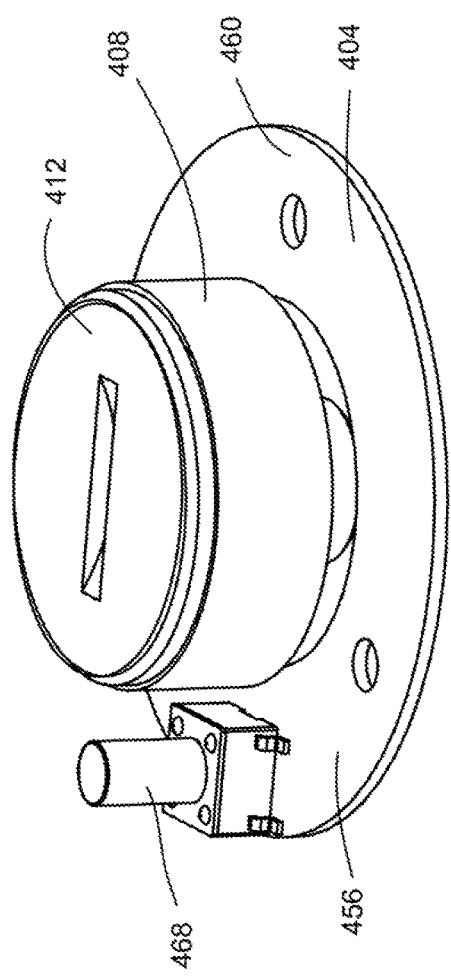
FIGS. 5A and 5B depict perspective views of a battery assembly and illumination assembly, according to one or more embodiments of the disclosure.
Figure 5B:
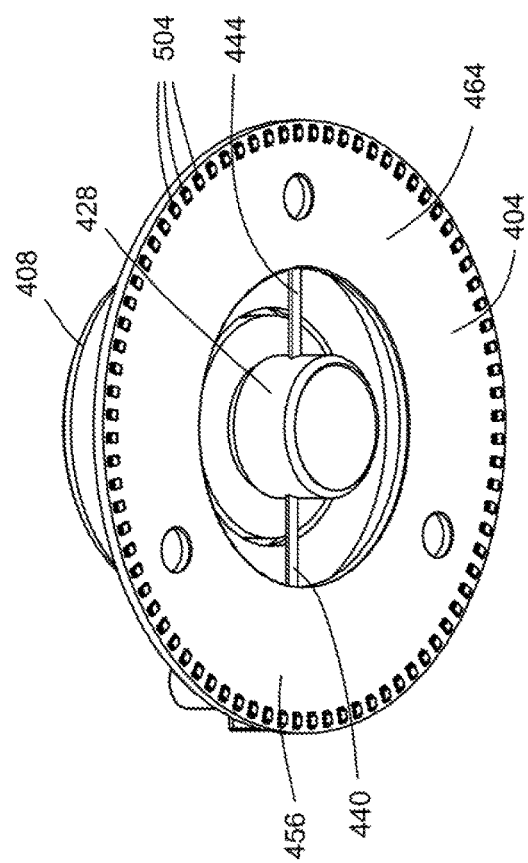

FIGS. 5A and 5B depict perspective views of the battery assembly 408 and illumination assembly 404, according to one or more embodiments of the disclosure. Described above with reference to FIG. 4, in various embodiments, the battery assembly 408 includes a battery cover 412, and battery contact portion 428. Depicted in FIGS. 5A and 5B, the battery assembly 408 is assembled, forming an electrical pathway from an enclosed battery to the illumination assembly 404 via electrical contacts 440 and 444. A plurality of lighting elements 504 are disposed on the downwardly facing surface 464 of the circuit board 456. In one or more embodiments, each of the lighting elements 504 comprise light-emitting diodes (LEDs). In an embodiment each lighting element 504 comprises a single LED transmitting light in the visible spectrum having a single color, such as substantially white light, yellow light, red light, blue light, and so on. In another embodiment, each lighting element 504 comprises multiple LEDs, each LED emitting a particular color, and each being separately controlled. For example, a lighting element 504 includes a plurality of selectable LEDs, including a first LED transmitting a first-color light, a second LED transmitting a second-color light, and a third LED transmitting a third-color light. In one such embodiment, the first, second and third LEDs include a white-light LED, a yellow-light LED, and a red-light LED. It will be understood, however, that the number of LEDs may be more or fewer. Additionally, although the lighting elements may comprise LEDs, it is contemplated that any suitable light source may be used in the illumination assembly 404.

In addition, while FIGS. 5A and 5B depict a plurality of lighting elements, in certain embodiments the illumination assembly 404 could include a single lighting element, or only a few lighting elements 504. For example, in some embodiments, the illumination assembly 404 could include a single lighting element having a light output sufficient for edge lighting or illuminating optical fibers in the turret cover, described further below. Further, in some embodiments the illumination assembly 404 could include a single ring shaped light element that replaces the ring of lighting elements 504 arranged on the downwardly facing surface 464 of the circuit board 456.

In various embodiments, the plurality of lighting elements 504 are arranged at or near the outer edge of the circuit board to form a circumferential ring. As such, and described further below, lighting elements are configured to illuminate the exterior sleeve portion via an edge-lighting process. For example, in various embodiments, the lighting elements 504 are positioned over the upwardly facing annular edge of the exterior sleeve portion and configured to transmit light through that edge and through the exterior sleeve portion thereby illuminating etched portions in the exterior sleeve portion.

In an embodiment, the number of lighting elements 504 corresponds to the number of adjustment marks 232 on the turret cover. In one such embodiment, a lighting element 504 is positioned above, and aligned vertically with a single adjustment mark 232.

Figure 6B:
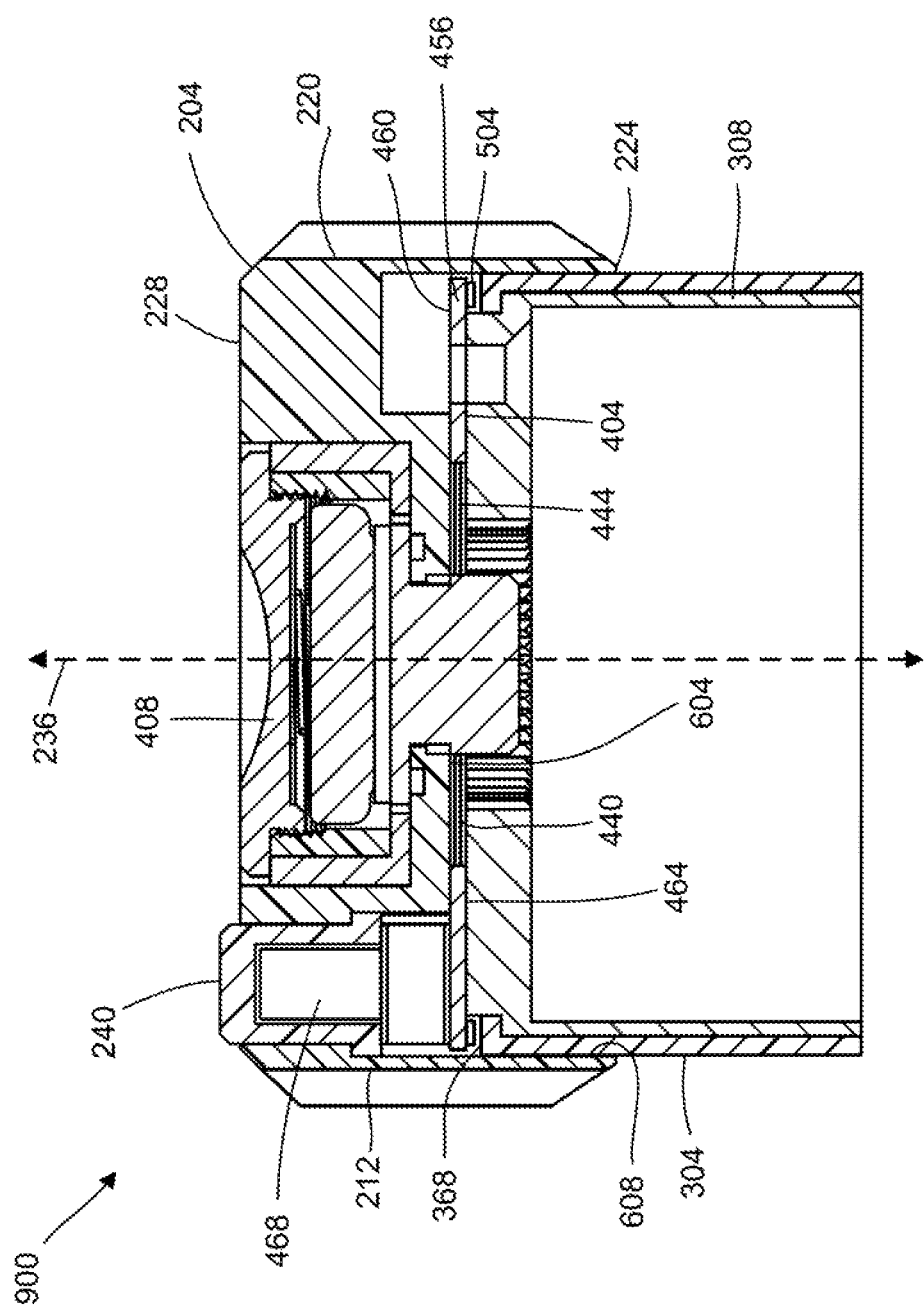

FIGS. 6A and 6B depict cross section views of a turret cover 200, according to one or more embodiments of the disclosure. As described above, in one or more embodiments, turret cover 200 includes an upper portion 204 including a turret housing 212 having a sidewall 220 extending from a lower end 224 to a top surface 228. In various embodiments, the lower end 224 of the sidewall 220 defines a first opening 612 in the turret housing 212 to a downwardly facing interior surface 604. In one or more embodiments, the downwardly facing interior surface 604 and a first interior surface 608 of the sidewall 220 define an illumination recess 614 in the turret housing 212. Illumination assembly 404 is mounted to the turret housing 212 in the illumination recess 614. As described above, illumination assembly 404 includes a circuit board 456 having an upwardly facing surface 460 mounted to downwardly facing interior surface 604 of the turret housing 212. Additionally, illumination assembly 404 includes a downwardly facing surface 464 including a plurality of lighting elements 504. Switch 468 and exterior switch 240 are aligned and configured to selectively control the output of lighting elements 504.

In one or more embodiments, the top surface 228 of the turret housing 212 defines a second opening 452 to an upwardly facing interior surface 616 defining a battery recess 448. Depicted in FIG. 6A, a battery assembly 408 is mounted in the battery recess 448. Illumination assembly 404 and battery assembly 408 are electrically connected via electrical contacts 440 and 444 to supply power to lighting elements 504.

As described above, the lower portion 208 includes an exterior sleeve portion 304 of an at least partially transparent plastic material surrounding an interior backing portion 308. Depicted in FIG. 6B, in assembly, the lower portion 208 is at least partially inserted into the illumination recess 614 and fastened to the upper portion 204 such that an upwardly facing annular edge 368 of the exterior sleeve portion 304 is positioned adjacent to the plurality of lighting elements 504 of the illumination assembly 404. Consequently, in operation, the lighting elements 504 of the illumination assembly are powered on by the battery assembly 408 and illuminate, via an edge lighting process, a plurality of etched adjustment marks in the exterior sleeve portion. Light is transmitted from the lighting elements into sleeve portion 304 at edge 368 through the light-transmissive medium that is exterior sleeve portion 304 to etched adjustment marks 232 causing them to be lighted.

FIG. 7 depicts another embodiment of a self-illuminated turret cover, self-illuminated turret cover 700, for a turret assembly, according to one or more embodiments of the disclosure. In various embodiments, turret cover 700 is the same or substantially similar to turret cover 200, described above with reference to FIG. 2. For example, turret cover 700 is a cap or top cover for a turret assembly and has a generally cylindrical shape defined by an upper portion 204 and a lower portion 208.

In one or more embodiments, the turret cover 700 is configured for self-illumination of adjustment marks 232. As described above, in various embodiments, the upper portion 204 includes a turret housing 704 that includes an illumination assembly and a plurality of lighting elements configured to illuminate the various adjustment marks 232 of the lower portion 208.

In certain embodiments, the turret housing 704 includes a plurality of solar panels 708 mounted on a top surface 712. In various embodiments, the plurality of solar panels 708 are configured to generate electrical charge for powering the illumination assembly, and for illuminating adjustment marks 232. In various embodiments, solar panels 708 are electrically connected with a rechargeable battery mounted within a battery assembly 716 in the turret housing 704. As such, and when exposed to sufficient light conditions, solar panels 708 charge the battery to extend battery life and illumination function for the turret cover 700. While solar panels 708 are depicted in FIG. 7 in the top surface 712 of the turret housing 704

Figure 8:
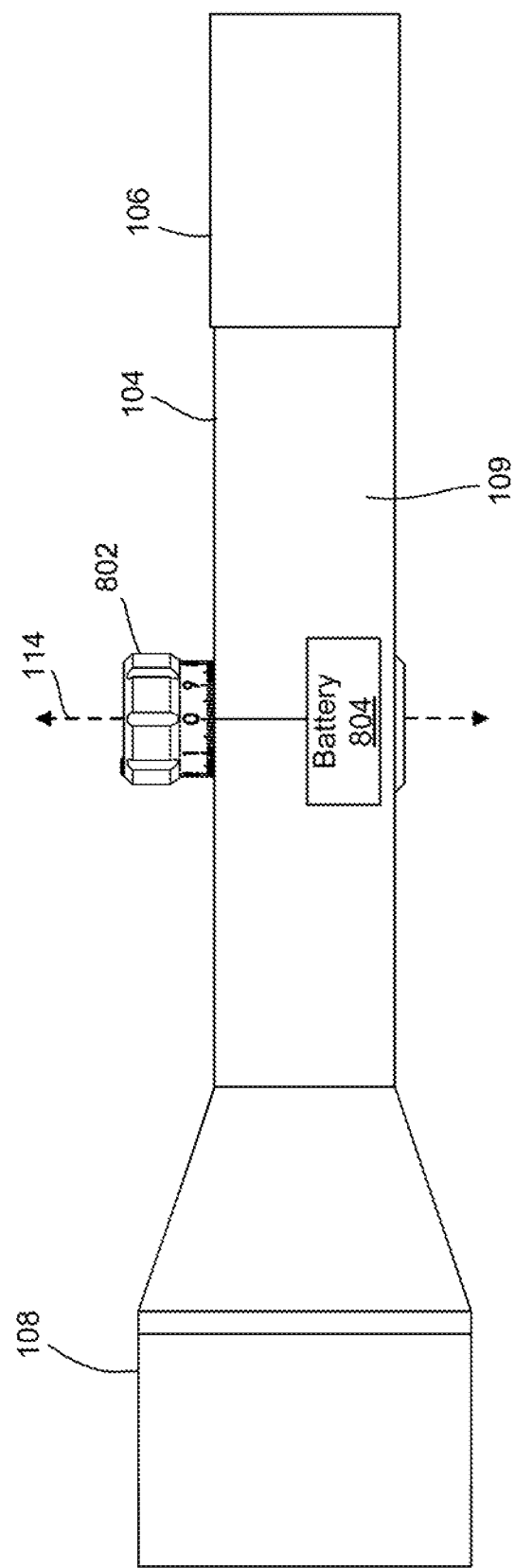
FIG. 8 depicts a side view of a firearm aiming device and turret assembly, according to one or more embodiments of the disclosure.

FIG. 8, depicts a firearm aiming device 800 according to one or more embodiments of the disclosure. The firearm aiming device 800 is an optical firearm scope or rifle scope, and, is the same or substantially similar to the firearm aiming device 100 in FIG. 1. For example, scope 800 includes a turret assembly 802, scope body 104, ocular housing 106 carrying an ocular lens system, and objective housing 108 carrying an objective lens system.

In one or more embodiments, turret assembly 802 includes a turret cover 804. Turret cover 804 is an exterior sheath or cover configured to be manipulated by a shooter to control the functional mechanisms in the interior mechanical portion. As described above, in various embodiments, turret cover 804 is configured for self-illumination of adjustment marks on the turret cover 804 for elevation or other aiming adjustments in low light conditions. As such, in one or more embodiments, the scope body 104 includes a battery assembly 804 mounted internally and electrically connected to the turret cover 802. For example, in some embodiments, battery assembly 804 is mounted opposite the elevation turret, in the eyepiece, or in other location for easy access by a shooter.

Figure 9:
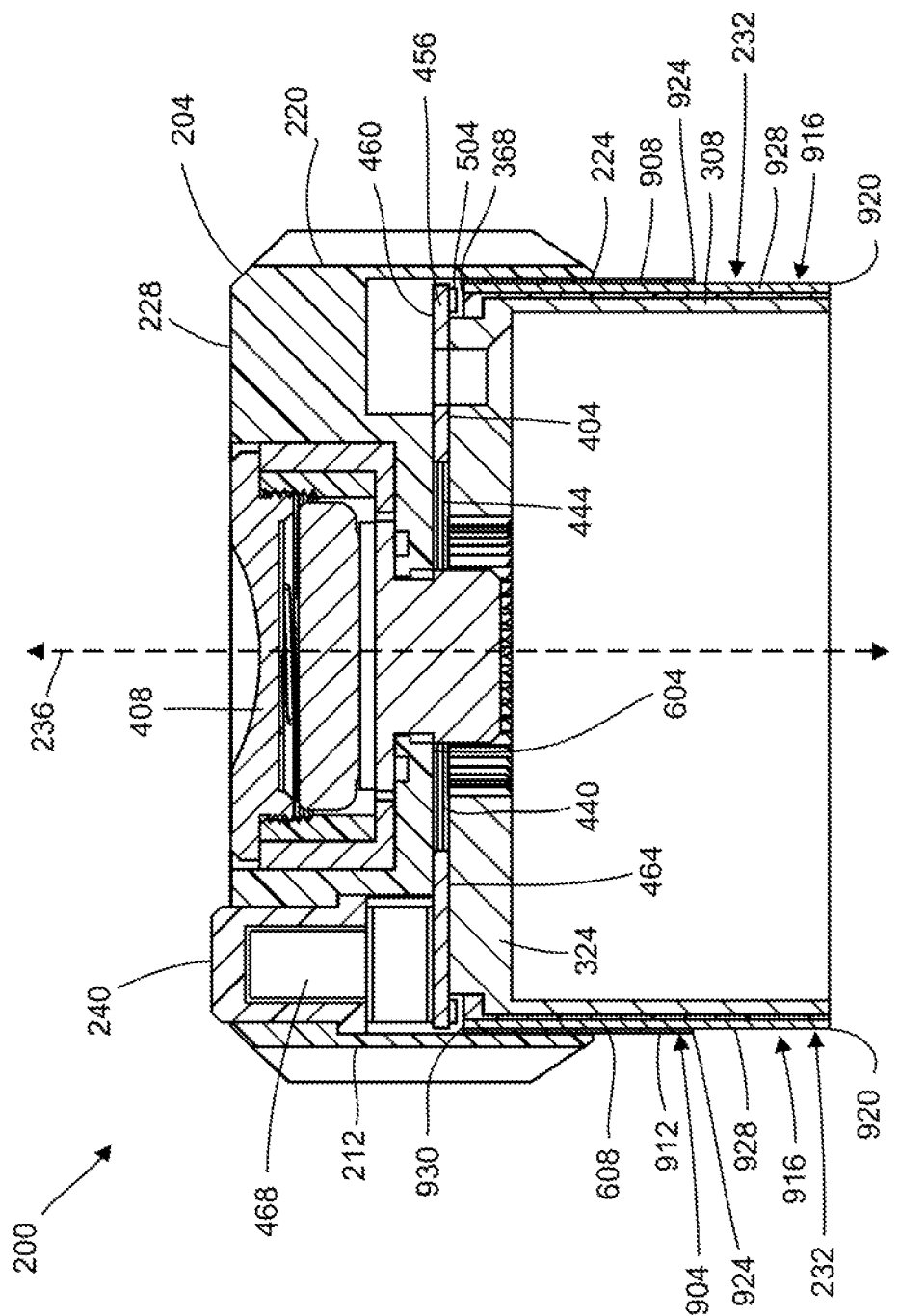
FIG. 9 depicts a cross-sectional view of a turret cover, according to one or more embodiments of the disclosure.

FIG. 9 depicts a cross-section view of a turret cover 900, according to one or more embodiments of the disclosure that utilizes fiber optics for providing lighted indicia. In various embodiments turret cover 900 includes the same or substantially similar components as turret cover 200, described above with reference to FIGS. 2, 6A, and 6B. Like elements are referred to with like reference numerals.

As such, in one or more embodiments, turret cover 900 includes an upper portion 204 including a turret housing 212 having a sidewall 220 extending from a lower end 224 to a top surface 228. In various embodiments, the lower end 224 of the sidewall 220 defines an opening or recess for positioning an illumination assembly 404 internally within the turret cover 900. As described above, illumination assembly 404 includes a circuit board 456 having an upwardly facing surface 460 mounted to downwardly facing interior surface 604 of the turret housing 212. Additionally, illumination assembly 404 includes a downwardly facing surface 464 including a plurality of lighting elements 504. Switch 468 and exterior switch 240 are aligned and configured to control the output of lighting elements 504.

In one or more embodiments, the top surface 228 of the turret housing 212 defines a second opening 452 to an upwardly facing interior surface 616 defining a battery recess 448. Depicted in FIG. 9, a battery assembly 408 is mounted in the battery recess 448. Illumination assembly 404 and battery assembly 408 are electrically connected via electrical contacts 440 and 444 to supply power to lighting elements 504.

In various embodiments, turret cover 900 includes a lower portion 904 including an exterior sleeve portion 908 surrounding an interior backing portion 308. In one or more embodiments, the exterior sleeve portion 908 is substantially similar to exterior sleeve portion 304, having a generally cylindrical shape defined by a sidewall 912 and a flange portion 324 that extends inwardly towards the central axis 236.

In addition, in various embodiments, the exterior sleeve portion 908 is constructed from an at least partially transparent material such as acrylic, polycarbonate, other suitable plastic, glass, or other suitable transparent material. In other embodiments sleeve portion 908 may not comprise a partially transparent material.

Additionally, in one or more embodiments, the exterior sleeve portion 908 includes a plurality of recesses 916 in sidewall 912. In various embodiments each of the recesses 916 are vertically oriented, extending along a portion of the height of the sidewall 912 from a bottom portion 920 to a mid-portion 924 located below the lower end 224 of the top portion 204.

In various embodiments each of the recesses 916 are positioned circumferentially about the exterior sleeve portion 908 and aligned with each of a plurality of optical fibers 928 that are included within the exterior sleeve portion 908. As such, in various embodiments the recesses 916 expose or otherwise make visible the optical fibers 928 from the exterior of the turret cover 900 between the bottom portion 920 and mid-portion 924.

As used herein, optical fibers refer to relatively thin fibers or strands of transparent or at least partially transparent material through which light can be transmitted. In certain embodiments, the optical fibers 928 include a transparent core portion that is surrounded by a cladding material having a lower index of refraction than the core portion. As such, the cladding material causes the fibers 928 to act as a waveguide, transmitting light from end to end of each of the fibers 928. In addition, described further below, in certain embodiments the cladding material is removed from some portion of the optical fibers 928 to achieve a glowing of illuminating effect from light traveling therethrough.

In various embodiments each of the optical fibers 928 are positioned within or inlaid within the interior of the exterior sleeve portion 908 and are vertically oriented, extending along the height of the exterior sleeve portion 908. As such, in various embodiments the optical fibers 928 extend from the bottom portion 920 to a top portion 930 flush with an upwardly facing annular edge 368 of the exterior sleeve portion 908

In one or more embodiments the optical fibers 928 are arranged circumferentially about the exterior sleeve portion to correspond to one or more of the adjustment marks 232, as depicted for example in FIG. 2. As such, in various embodiments the optical fibers 928 act as the adjustment marks 232, externally visible to a user via the recesses 916 through the sidewall 912 of the exterior sleeve portion 908.

Depicted in FIG. 9, in assembly, the lower portion 904 is at least partially inserted into the recess defined by the upper portion 204 and fastened to the upper portion 204 such that an upwardly facing annular edge 368 of the exterior sleeve portion 304 is positioned adjacent to the plurality of lighting elements 504 of the illumination assembly 404. Consequently, in operation, the lighting elements 504 of the illumination assembly are powered on by the battery assembly 408 and illuminate, via the optical fibers 928, the plurality of adjustment marks for the turret cover 900. For example, in certain embodiments, the adjustment marks 232 are illuminated by light which is received via the top portion 930 of the optical fibers 928 and which is transmitted through the material of the optical fibers 928. In various embodiments, transparent cladding of the optical fibers 928 is removed from the optical fiber 928 where the fibers are exposed. As such, each of the optical fibers 928 are configured to defined illuminated or glowing adjustment marks 232. Additionally, in certain embodiments, the optical fibers 928 can be painted, for example using tritium paint, or other suitable paint, to improve the visibility of the etched adjustment marks 232.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A turret cover for a turret assembly on a firearm aiming device, the turret cover comprising:
an upper portion including a turret housing defining a battery recess and an illumination recess;
a battery assembly mounted in the battery recess;
an illumination assembly mounted in the illumination recess and electrically connected to the battery assembly, the illumination assembly including a lighting element; and
a lower portion including an exterior sleeve portion of an at least partially transparent plastic material, the exterior sleeve portion including a plurality of adjustment marks etched into the at least partially transparent material, the lower portion at least partially inserted into the illumination recess such that an upwardly facing edge of the exterior sleeve portion is positioned adjacent to the lighting element of the illumination assembly;

wherein, in operation, the lighting element of the illumination assembly is powered on by the battery assembly and illuminates, via an edge-lighting process, the plurality of etched adjustment marks.

2. The turret cover of claim 1, wherein the turret housing has a sidewall extending from a lower end to a top surface, the lower end of the sidewall defining a first opening in the turret housing to a downwardly facing interior surface, the downwardly facing interior surface and a first interior surface of the sidewall defining the illumination recess.

3. The turret cover of claim 2, wherein the top surface of the turret housing defines a second opening in the turret housing to an upwardly facing interior surface, the upwardly facing interior surface and a second interior surface of the sidewall defining the battery recess.

4. The turret cover of claim 2, wherein the illumination assembly includes a circuit board having an upwardly facing surface positioned adjacent to the downwardly facing interior surface and the circuit board having a downwardly facing surface including the lighting element.

5. The turret cover of claim 1, wherein the exterior sleeve portion has a sidewall extending from a lower end to an upper end, the sidewall defining a first opening at the upper end and a second opening at the lower end, the upper end of the sidewall including an inwardly extending flange portion at the upper end.

6. The turret cover of claim 5, wherein the lower portion is at least partially inserted into the illumination recess and fastened to the upper portion such that an upwardly facing edge at the upper end of the exterior sleeve portion is positioned adjacent to the lighting element of the illumination assembly.

7. The turret cover of claim 5, wherein the exterior sleeve portion surrounds an interior backing portion having a sidewall that extends from a lower end to an upper end, the interior backing portion including a circumferential lip, at the upper end, defined by an inwardly extending circumferential recess in the sidewall, the interior backing portion upwardly insertable into the exterior sleeve portion via the second opening such that the flange portion of the exterior sleeve portion and the circumferential lip fit together to limit upward insertion of the interior backing portion.

8. The turret cover of claim 7, wherein the interior backing portion is constructed from a non-transparent material.

9. The turret cover of claim 1, wherein:
the exterior sleeve portion has a painted interior surface such that the interior surface is substantially non-transparent.

10. The turret cover of claim 1, wherein:
the illumination assembly further includes a switch configured to control output of the lighting element; and
the turret housing includes a push button configured to interact with the switch in the illumination recess.

11. The turret cover of claim 10, wherein: the switch is configured to toggle the output of the lighting element between at least three different outputs.

12. The turret cover of claim 1, wherein the exterior sleeve portion is constructed from at least one of acrylic and polycarbonate.

13. The turret cover of claim 1, wherein the plurality of adjustment marks are painted using a reflective material paint.

14. A firearm aiming device comprising:
a scope body including an interior erector assembly and reticle cell;
a turret assembly mounted on the scope body, the turret assembly including an interior mechanical portion configured to engage the erector assembly within the scope body for aiming adjustments, the turret assembly further including a turret cover enclosing the interior mechanical portion, the turret cover including:
an upper portion including a turret housing defining a battery recess and an illumination recess;
a battery assembly mounted in the battery recess;
an illumination assembly mounted in the illumination recess and electrically connected to the battery assembly, the illumination assembly including a lighting element; and
a lower portion including an exterior sleeve portion of an at least partially transparent plastic material, the exterior sleeve portion including a plurality of adjustment marks etched into the at least partially transparent material, the lower portion at least partially inserted into the illumination recess such that an upwardly facing edge of the exterior sleeve portion is positioned adjacent to the lighting element of the illumination assembly;
wherein, in operation, the lighting element of the illumination assembly is powered on by the battery assembly and illuminates, via an edge lighting process, the plurality of etched adjustment marks.

15. The firearm aiming device of claim 14, wherein the turret housing has a sidewall extending from a lower end to a top surface, the lower end of the sidewall defining a first opening in the turret housing to a downwardly facing interior surface, the downwardly facing interior surface and a first interior surface of the sidewall defining the illumination recess.

16. The firearm aiming device of claim 15, wherein the illumination assembly includes a circuit board having an upwardly facing surface positioned adjacent to the downwardly facing interior surface and the circuit board having a downwardly facing surface including the lighting element.

17. The firearm aiming device of claim 14, wherein the exterior sleeve portion has a sidewall extending from a lower end to an upper end, the sidewall defining a first opening at the upper end and a second opening at the lower end, the upper end of the sidewall including an inwardly extending flange portion at the upper end; and
the lower portion is at least partially inserted into the illumination recess and fastened to the upper portion such that an upwardly facing edge at the upper end of the exterior sleeve portion is positioned adjacent to the lighting element of the illumination assembly.

18. The firearm aiming device of claim 17, wherein the exterior sleeve portion surrounds an interior backing portion having a sidewall that extends from a lower end to an upper end, the interior backing portion including a circumferential lip, at the upper end, defined by an inwardly extending circumferential recess in the sidewall, the interior backing portion upwardly insertable into the exterior sleeve portion via the second opening such that the flange portion of the exterior sleeve portion and the circumferential lip fit together to limit upward insertion of the interior backing portion.

19. A turret cover for a turret assembly on a firearm aiming device, the turret cover comprising:
an upper portion including a turret housing defining a battery recess and an illumination recess;
a battery assembly mounted in the battery recess;

an illumination assembly mounted in the illumination recess and electrically connected to the battery assembly, the illumination assembly including a lighting element; and a lower portion including an exterior sleeve portion having a sidewall extending from a lower end to an upper end and defining a first opening at the upper end and a second opening at the lower end, the sidewall including a plurality of optical fibers, each of the plurality of optical fibers positioned at least partially within the sidewall extending between the upper end and lower end of the sidewall, each of the plurality of optical fibers having an exposed first end at an upwardly facing edge of the upper end of the sidewall, the sidewall including a plurality of adjustment marks spaced circumferentially about an exterior surface of the sidewall, the lower portion at least partially inserted into the illumination recess such that the upwardly facing edge is positioned adjacent to the lighting element of the illumination assembly;

wherein, in operation, the lighting element of the illumination assembly is powered on by the battery assembly and illuminates, via the plurality of optical fibers, the plurality of adjustment marks.

20. The turret cover of claim 19, wherein the sidewall includes a plurality of recesses in an exterior of the sidewall that expose a portion of each of the plurality of optical fibers, wherein the plurality of adjustment marks are defined by the portions of the plurality of optical fibers exposed by the plurality of recesses.

* * * * *